(12) United States Patent
Wu

(10) Patent No.: US 6,739,329 B2
(45) Date of Patent: May 25, 2004

(54) BARBECUE DEVICE

(75) Inventor: Tsan-Kuen Wu, Tainan Hsien (TW)

(73) Assignee: Tsann Kuen USA Inc., Pasadena, CA (US)

( * ) Notice: Subject to any disclaimer, the term of this patent is extended or adjusted under 35 U.S.C. 154(b) by 246 days.

(21) Appl. No.: 10/005,047

(22) Filed: Dec. 4, 2001

(65) Prior Publication Data

US 2003/0101982 A1 Jun. 5, 2003

(51) Int. Cl.⁷ .................................. F24C 1/16
(52) U.S. Cl. ................ 126/41 R; 126/25 R; 126/40; 126/50; 126/305
(58) Field of Search .............. 126/25 R, 41 R, 126/307 R, 304 A, 305, 40, 50, 276

(56) References Cited

U.S. PATENT DOCUMENTS

| | | | | |
|---|---|---|---|---|
| 2,742,033 A | * | 4/1956 | Bramming | 126/38 |
| 3,008,463 A | * | 11/1961 | Frank | 126/9 R |
| 3,124,057 A | * | 3/1964 | Kiser | 126/9 R |
| 3,386,430 A | * | 6/1968 | Linstead | 126/25 A |
| 4,210,118 A | * | 7/1980 | Davis et al. | 126/25 R |
| 4,949,701 A | * | 8/1990 | Krosp et al. | 126/41 R |
| 5,050,577 A | * | 9/1991 | Baynes et al. | 126/9 R |
| 5,832,915 A | * | 11/1998 | Skidmore et al. | 126/9 R |
| 6,205,912 B1 | * | 3/2001 | Chiu | 99/339 |
| D460,658 S | * | 7/2002 | Wu | D7/334 |
| 6,439,221 B1 | * | 8/2002 | Ward et al. | 126/25 R |
| D465,691 S | * | 11/2002 | Wu | D7/332 |
| 6,513,515 B1 | * | 2/2003 | Wu | 126/41 R |
| 6,606,987 B2 | * | 8/2003 | DeMars | 126/38 |
| 2002/0069866 A1 | * | 6/2002 | DeMars | 126/38 |
| 2003/0106546 A1 | * | 6/2003 | Wu | 126/41 R |

FOREIGN PATENT DOCUMENTS

| | | | | |
|---|---|---|---|---|
| DE | 28 00 857 A1 | * | 7/1979 | A47J/37/07 |
| JP | 8-178294 A | * | 9/1995 | F24C/1/16 |

* cited by examiner

Primary Examiner—James G. Barrow
(74) Attorney, Agent, or Firm—Ostrolenk, Faber, Gerb & Soffen, LLP (57) ABSTRACT

A barbecue device includes a support unit with opposite first and second connecting rods that interconnect U-shaped first and second support members, and a cook unit supported removably on horizontal bars of the support members. The support unit is turnable upside-down, and confines a receiving space which opens upwardly when turned upside-down for receiving the cook unit therein. A looped retainer frame is pivoted to the second connecting rod, and engages releasably the first connecting rod. The retainer frame is turnable away from and toward the horizontal bars for moving between an open position, in which the cook unit can be placed in the receiving space, and a closed position, in which the retainer frame engages releasably the first connecting rod for retaining the cook unit in the receiving space.

8 Claims, 7 Drawing Sheets

BARBECUE DEVICE

BACKGROUND OF THE INVENTION

1. Field of the Invention

The present invention relates to a barbecue device, more particularly to a barbecue device which can be converted into a compact state that occupies a relatively small amount of storage space.

2. Description of the Related Art

A conventional barbecue device generally includes a cook unit installed with a barbecue grill, and a leg unit for supporting the cookunit above a ground surface. The leg unit may be installed with wheels to permit movement of the barbecue device along the ground surface, and the cook unit may be removable from the leg unit when the barbecue device is not in use. However, the cook unit and the leg unit occupy individual storage spaces having a relatively large combined volume when the barbecue device is not in use, and inconveniences during the transport of the barbecue device thus exist.

SUMMARY OF THE INVENTION

Therefore, the main object of the present invention is to provide a barbecue device which occupies a relatively small amount of storage space and which facilitates the transport thereof.

Accordingly, the barbecue device of the present invention includes a support unit, a cook unit, and a retainer frame. The support unit includes inverted U-shaped first and second support members, each having a horizontal bar and left and right upright posts that extend downwardly and respectively from two opposite ends of the horizontal bar. The support unit further includes a first connecting rod that extends transversely between and that interconnects the left upright posts of the first and second support members, and a second connecting rod that extends transversely between and that interconnects the right upright posts of the first and second support members. The cook unit is disposed removably on the horizontal bars so as to be supported by the support unit. The support unit is turnable upside-down, and confines a receiving space which opens upwardly when the support unit is turned upside-down for receiving the cook unit therein upon removal of the cook unit from the horizontal bars of the first and second support members. The retainer frame has a pivot portion mounted pivotally on the second connecting rod for pivoting about an axis of the second connecting rod, a retaining portion opposite to the pivot portion, and a pair of linking arms interconnecting the pivot portion and the retaining portion. The retainer frame is turnable away from and toward the horizontal bars about the axis of the second connecting rod for moving between an open position, in which the retaining portion is disposed away from the first connecting rod to permit placing of the cook unit into the receiving space, and a closed position, in which the retaining portion is disposed on and engages releasably the first connecting rod for retaining the cook unit in the receiving space.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
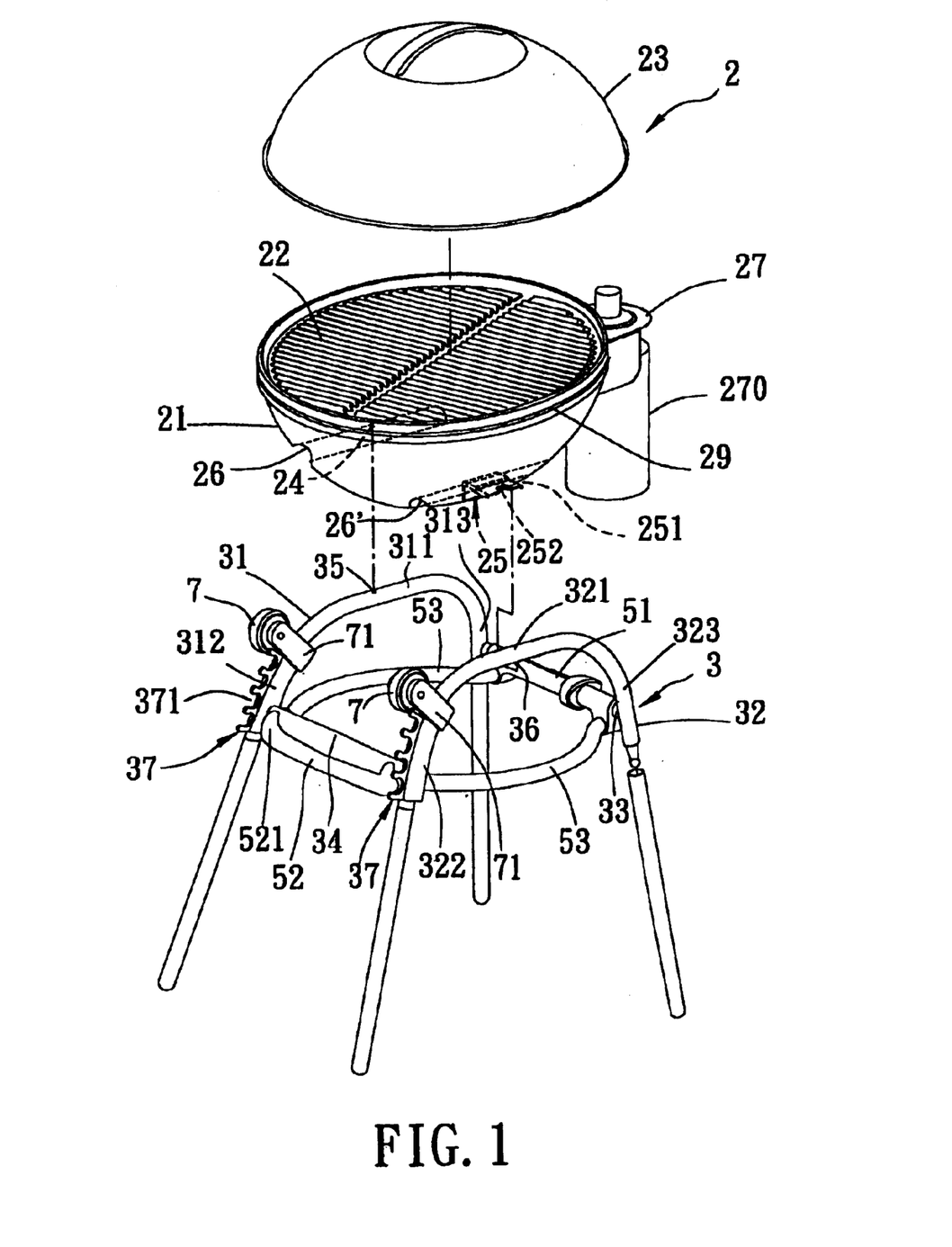
FIG. 1 is an exploded perspective view of a preferred embodiment of the barbecue device of the present invention.
Figure 2:
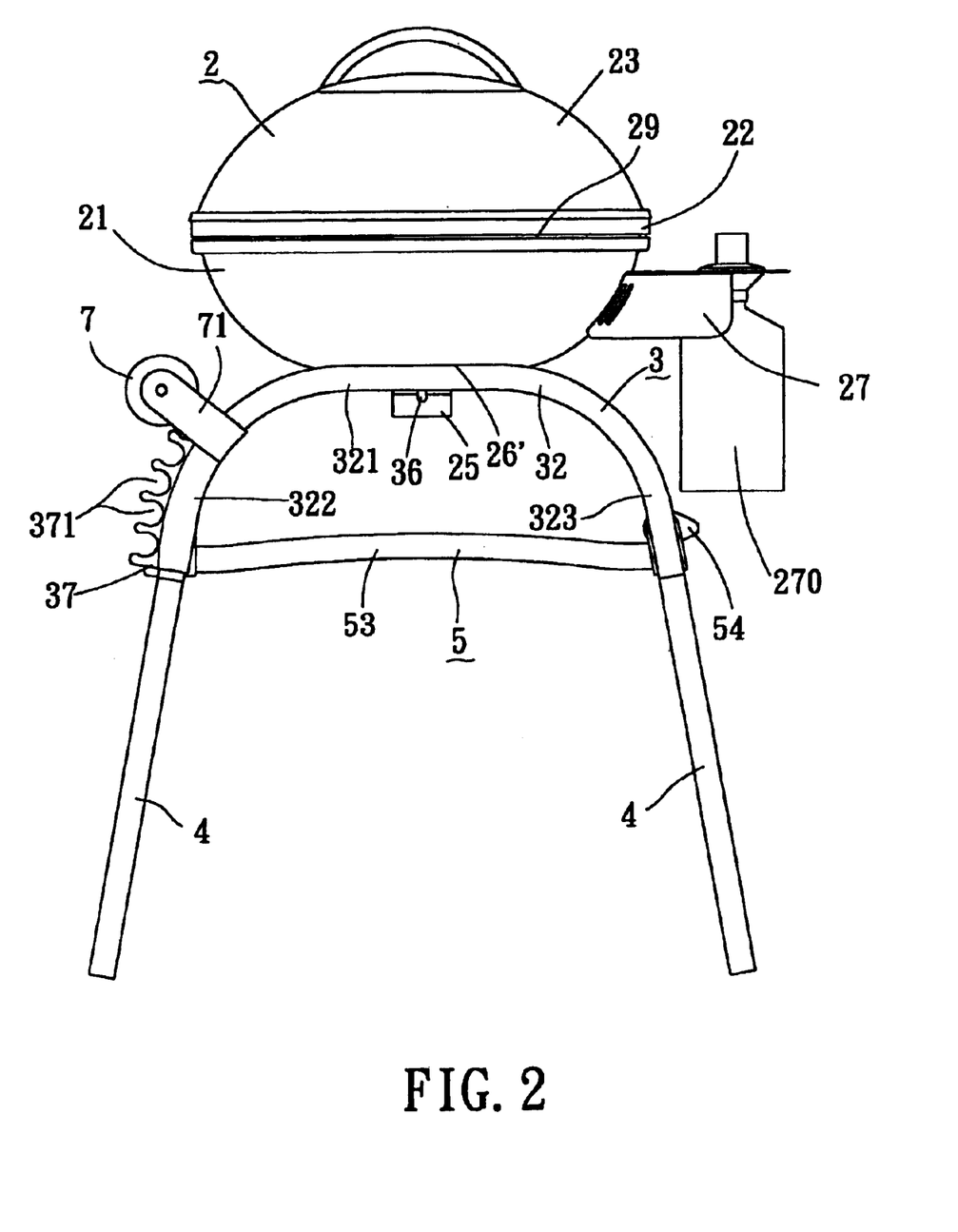
FIG. 2 is a front-side view of the preferred embodiment.
Figure 3:
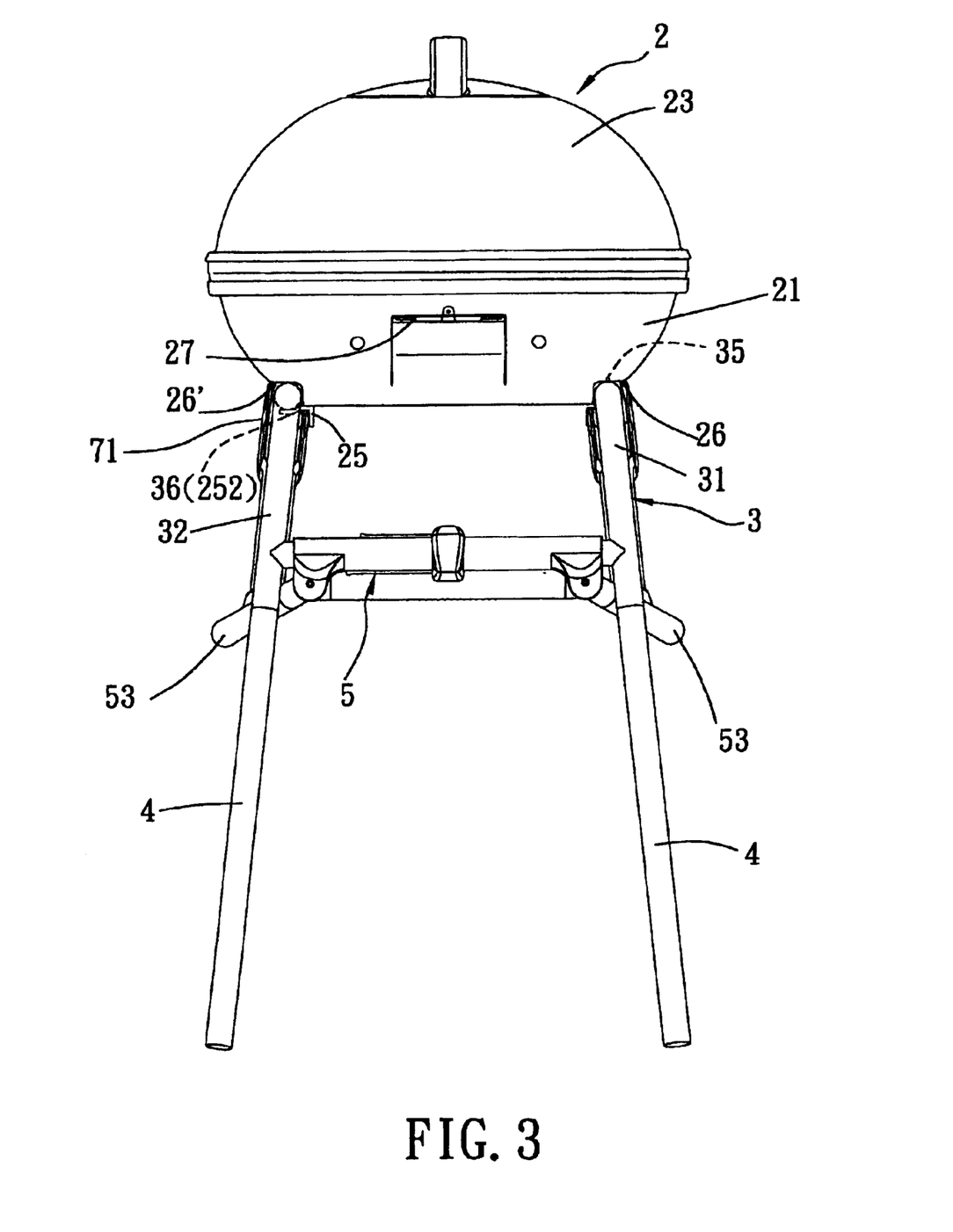
FIG. 3 is a right-side view of the preferred embodiment with the gas cylinder of FIG. 1 omitted.

Referring to FIGS. 1 to 3, the preferred embodiment of the barbecue device of the present invention is shown to include a cook unit 2, a support unit 3, a retainer frame 5, four upright leg members 4, and two wheel members 7.

The cook unit 2 includes a bowl-shaped hollow cooking base 21 mounted with a grill member 22 on a top side thereof, and a dome-shaped top cover 23 covering the top side of the cooking base 21. Each of the cooking base 21 and the top cover 23 has a circular periphery. The cooking base 21 is mounted with a bracket 27 that is adapted for retaining a gas cylinder 270. A slit 29 is formed between the grill member 22 and an upper edge of a surrounding wall of the cooking base 21 to permit release of fuel gas from the interior of the cook unit 2 for safety considerations. The cooking base 21 is further installed with a burner (not shown) therein for heating the grill member 22. The cooking base 21 has a bottom side formed with parallel first and second positioning grooves 26, 26', and a positioning hole 24 formed in the first positioning groove 26. An L-shaped engaging plate 25 is mounted on the bottom side of the cooking base 21, and has a horizontal plate portion 251 that extends immediately below the second positioning groove 26' and that is formed with a notch 252.

The support unit 3 includes first and second support members 31, 32, each of which is formed as a U-shaped rod, and each of which includes a respective horizontal bars 311 and 321, and respective left 312, 322 and right 313, 323 upright posts extending downwardly from two opposite ends of the horizontal bars 311, 321. The horizontal bars 311, 321 of the first and second support members 31, 32 are parallel to each other. The support unit 3 further includes a first connecting rod 34 that extends transversely between the left upright posts 312, 322 of the first and second support members 31, 32 for interconnecting the same, and a second connecting rod 33 that extends transversely between the right upright posts 313, 323 of the first and second support members 31, 32 for interconnecting the same. The first and second connecting rods 34, 33 are disposed at a level lower than the horizontal bars 311, 321 of the first and second support members 31, 32. In use, the cooking base 21 can be disposed on the horizontal bars 311, 321 such that the horizontal bars 311, 321 of the first and second support members 31, 32 extend respectively into the first and second positioning grooves 26, 26' on the bottom side of the cooking base 21 of the cook unit 2 and such that the horizontal bar 321 of the second support member 32 is disposed between the engaging plate 25 and the bottom side of the cooking base 21. The horizontal bar 311 of the first support member 31 is formed with an upwardly projecting first pin projection 35 that extends into and that engages removably the positioning hole 24 in the first positioning groove 26. The horizontal bar 321 of the second support member 32 is formed with a downwardly projecting second pin projection 36 which engages removably the notch 252 in the engaging plate 25. The positioning grooves 26, 26', the positioning hole 24, and the notch 252 in the engaging plate 25 cooperatively help to position the cook unit 2 on the support unit 3. Each of the left upright posts 312, 322 is provided with a clamping member 37 which is formed with four clamping grooves 371 that are displaced vertically along the length of the respective post 312, 322. The clamping grooves 371 in the left upright post 312 of the first support member 31 are aligned respectively with the clamping grooves 371 in the left upright post 322 of the second support member 32.

Each of the leg members 4 has a tubular upper end sleeved on and coupled removably to a lower end of a respective one of the upright posts 312, 322, 313, 323 of the first and second support members 31, 32, and a lower end adapted to be disposed on a ground surface for supporting the support unit 3, and thus the cook unit 2, above the ground surface at a predetermined height.

The retainer frame 5 is in the form of a looped frame, and includes a pivot portion 51 sleeved rotatably on the second connecting rod 33 for pivoting about an axis of the second connecting rod 33, a retaining portion 52 opposite to and generally parallel to the pivot portion 51, and a pair of curved linking arms 53 interconnecting ends of the pivot portion 51 and the retaining portion 52, thereby forming the looped frame. The retaining portion 52 is disposed under the first connecting rod 34, and is formed with a pair of hook projections 521 that project upwardly for hooking removably at the first connecting rod 34 from the bottom side of the latter. A retaining block 54 is sleeved on the pivot portion 51 SO as to be co-rotatable with the pivot portion 51 and so as be slidable along the pivot portion 51 between an intermediate section of the pivot portion 51 and one of the opposite ends of the pivot portion 51. The retaining block 54 has a projecting end 541.

Each of the wheel members 7 is mounted on a respective one of the first and second support members 31, 32, at the juncture of the horizontal bar 311, 321 and the left upright post 312, 322 by means of a respective wheel seat 71.

Figure 4:
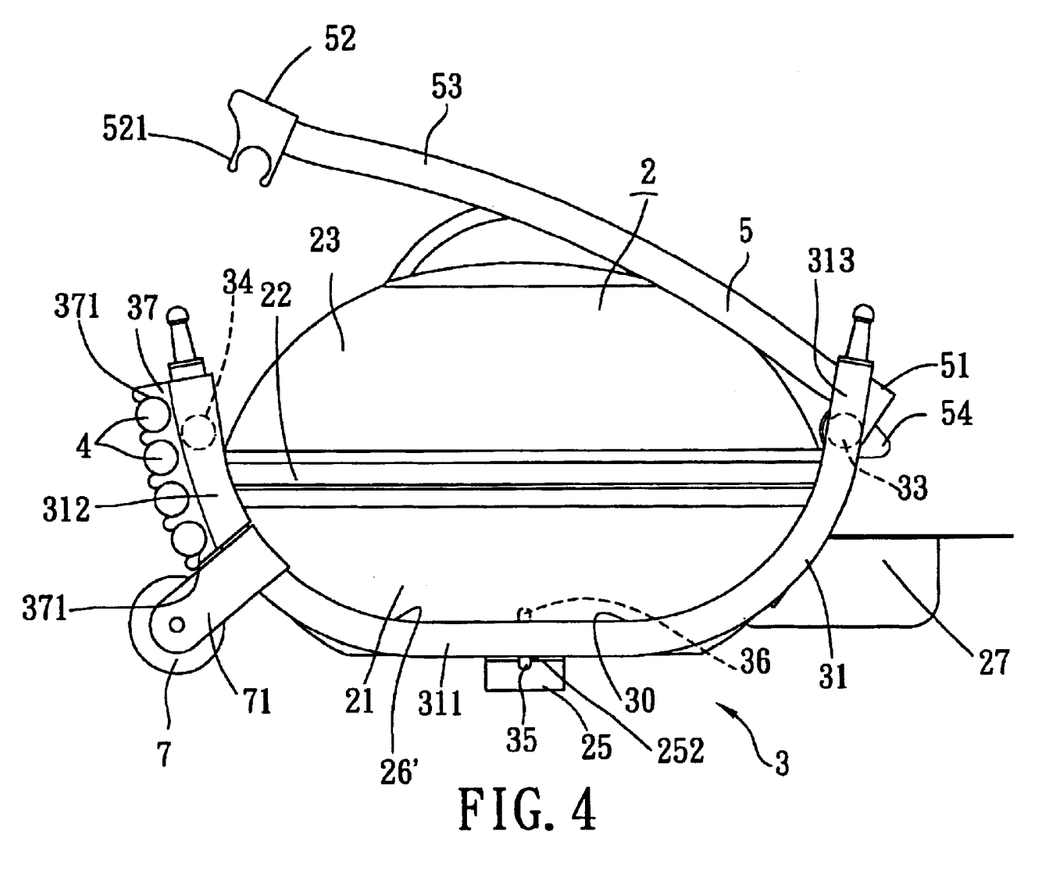
FIGS. 4 and 5 illustrate the preferred embodiment in a compact state, where a cook unit is received in a support unit.
Figure 5:
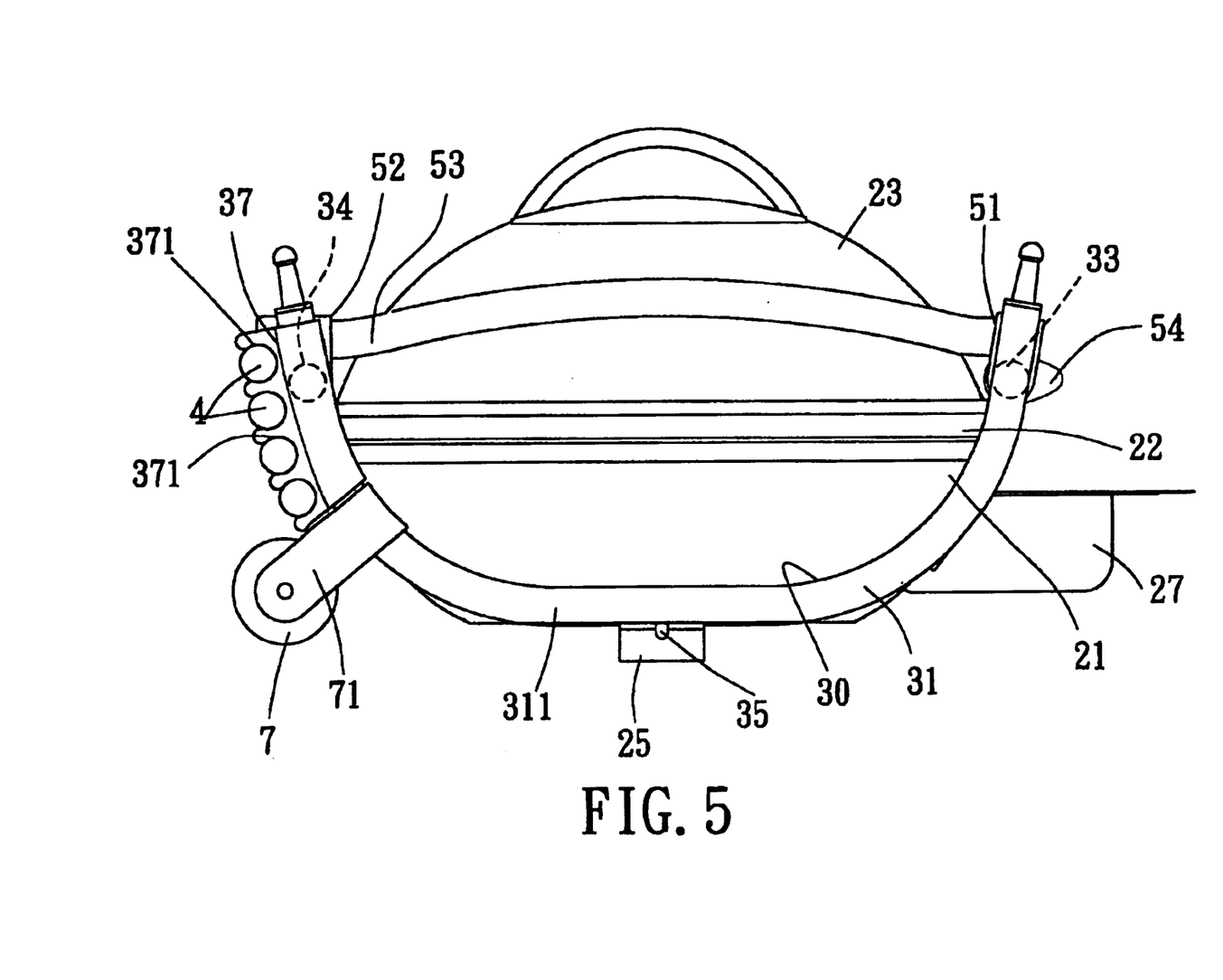
Figure 6:
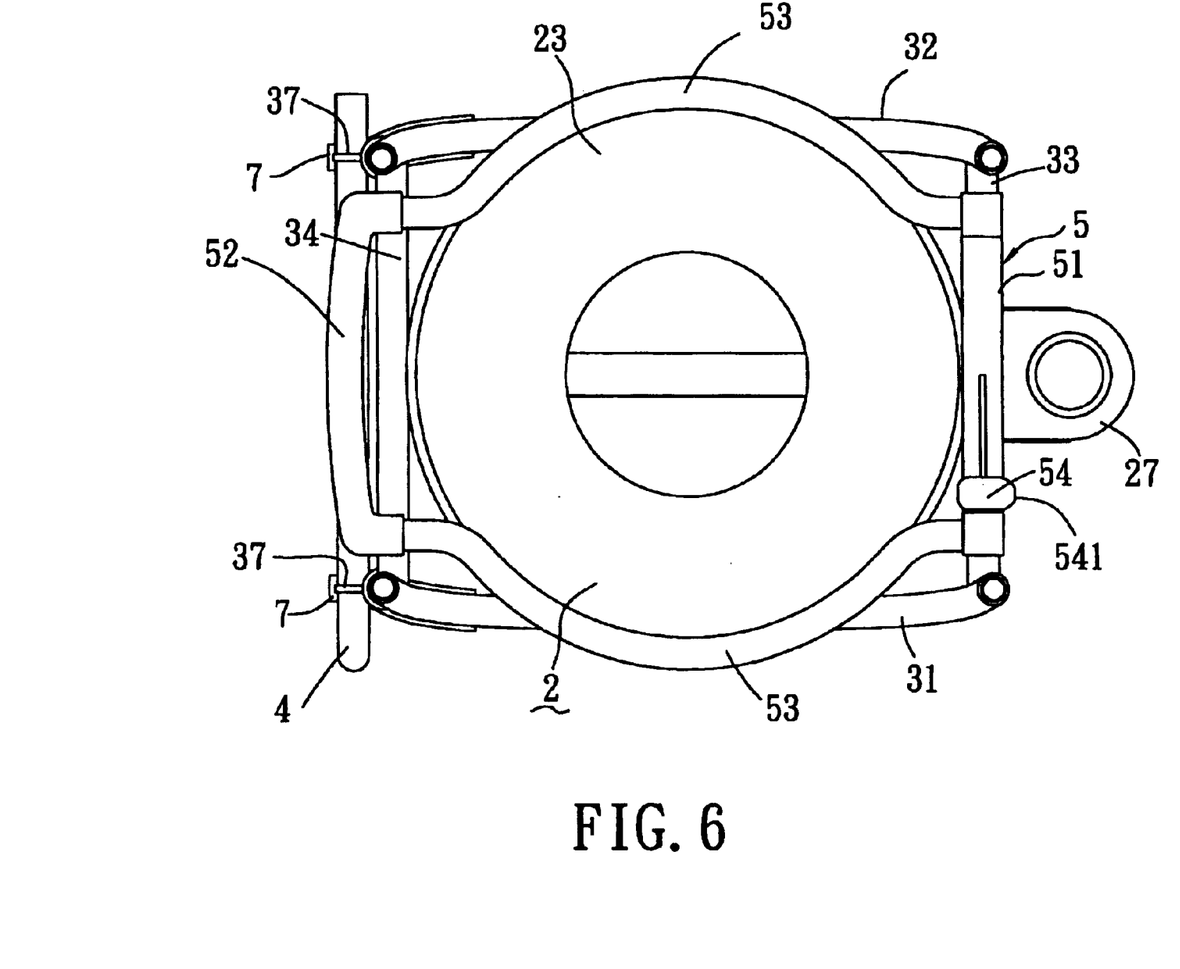
FIG. 6 is a top view of the preferred embodiment in the compact state.

The barbecue device of the present invention, after use, can be converted into a compact state that facilitates transport thereof and that occupies a relatively small amount of storage space. To conduct the conversion, the cook unit 2 is first removed from the support unit 3, and the gas cylinder 270 is removed from the bracket 27. Referring to FIGS. 1 and 4, the support unit 3, together with the leg members 4 connected thereto, are turned upside-down such that each of the first and second support members 31, 32 has an upwardly opening U-shaped formation, with the horizontal bars 311, 321 being disposed at bottom and with the upright posts 312, 322, 313, 323 being oriented upward. At this time, the first pin projection 35 projects downwardly, while the second pin projection 36 projects upwardly. Each of the leg members 4 is then removed from the respective one of the upright posts 312, 322, 313, 323, and is disposed transversely between the left upright posts 312, 322 of the first and second support members 31, 32 for engaging a respective aligned pair of the clamping grooves 371. The support unit 3 confines a receiving space 30 that opens upwardly at this time for receiving the cook unit 2 therein. Subsequently, the retainer frame 5 is turned about the axis of the second connecting rod 33 in an upward direction away from the horizontal bars 311, 321 to an open position, in which the retaining portion 52 is disposed away from the first connecting rod 34 to permit placing of the cook unit 2 into the receiving space 30. The cook unit 2 is then disposed in the receiving space 30 such that the first and second positioning grooves 26, 26' engage the horizontal bars 321, 311 of the second and first support members 32, 31, respectively, and such that the positioning hole 24 and the notch 252 in the engaging plate 25 engage the second and first pin projections 36, 35, respectively, for positioning the cook unit 2 in the receiving space 30. Thereafter, the retainer frame 5 is turned downwardly toward the horizontal bars 311, 321 to a closed position, in which the retaining portion 51 is disposed on the first connecting rod 34 and engages releasably the first connecting rod 34 by means of the hook projections 521, as shown in FIGS. 1, 5 and 6. At this time, the linking arms 53 of the retainer frame 5 abut against a top side of the top cover 23 for retaining the cook unit 2 in the receiving space 30.

Referring to FIGS. 1, 5 and 6, since the top cover 23 and the cooking base 21 of the cook unit 2 have circular peripheries, and since the pivot portion 51 of the retainer frame 5 is elongated, the two opposite ends of the pivot portion 51 are spaced apart from the peripheries of the top cover 23 and the cooking base 21, while the intermediate section of the pivot portion 51 is disposed closely adjacent to the peripheries of the top cover 23 and the cooking base 21 when the cook unit 2 is received in the receiving space 30. As such, during turning of the retaining frame 5 between the open and closed positions, the retaining block 54 is slid to one of the two opposite ends of the pivot portion 51 to avoid engaging the cook unit 2 and hindering pivoting movement of the retainer frame 5. When the retaining frame 5 moves to the closed position, as shown in FIG. 6, the projecting end 541 is oriented outwardly away from the receiving space 30.

Figure 7:
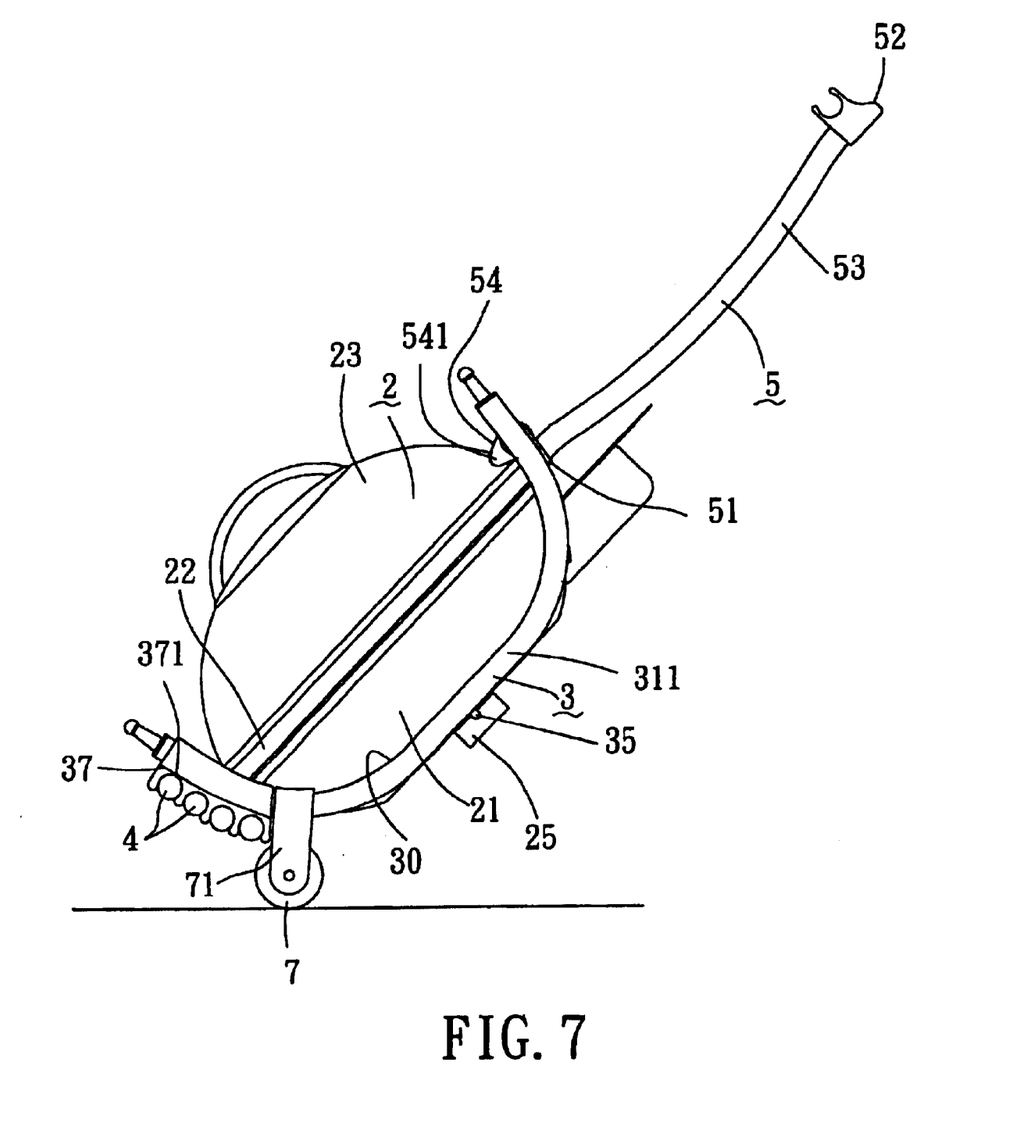
FIG. 7 is a side view of the preferred embodiment in the compact state when moved along a ground surface.

Referring to FIGS. 1 and 7, after being converted into the compact state, the barbecue device of the present invention can be moved along the ground surface by virtue of the wheel members 7 that are in rolling contact with the ground surface. The retainer frame 52 is turned once again to the open position, and is disposed at a position that is about 180 degrees displaced from its closed position with respect to the axis of the second connecting rod 33, resulting in corresponding rotation of the retaining block 54 by about 180 degrees with the pivot portion 51, thereby enabling the projecting end 541 to project inwardly into the receiving space 30. The retaining block 54 is then slid to the intermediate section of the pivot portion 51, thereby enabling the projecting end 541 thereof to abut against the top side of the top cover 23 to help retain the cook unit 2 in the receiving space 31. Since the retaining block 54 is sleeved non-rotatably on the pivot portion 51, and since the retaining block 54 abuts against the top cover 23 at this time, the retainer frame 5 is thus retained in the open position at the 180 degrees-angular position relative to the closed position at this time. The retaining portion 52 can then serve as a handle for pulling the barbecue device so as to move the barbecue device along the ground surface by means of the wheel members 7.

It has thus been shown that, by simply receiving the cook unit 2 in the upside-down state of the support unit 3, the barbecue device of the present invention can be converted into a compact state in which a relatively small storage space is required and in which movement of the barbecue device along the ground surface can be facilitated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A barbecue device comprising:

a support unit including inverted U-shaped first and second support members, each having a horizontal bar and left and right upright posts that extend downwardly and respectively from two opposite ends of said horizontal bar, said support unit further including a first connecting rod that extends transversely between and that interconnects said left upright posts of said first and second support members, and a second connecting rod that extends transversely between and that interconnects said right upright posts of said first and second support members;

a cook unit disposed removably on said horizontal bars so as to be supported by said support unit;

said support unit being turnable upside-down and confining a receiving space which opens upwardly when said support unit is turned upside-down for receiving said cook unit therein upon removal of said cook unit from said horizontal bars of said first and second support members; and a retainer frame having a pivot portion mounted pivotally on said second connecting rod for pivoting about an axis of said second connecting rod, a retaining portion opposite to said pivot portion, and a pair of linking arms interconnecting said pivot portion and said retaining portion, said retainer frame being turnable away from and toward said horizontal bars about the axis of said second connecting rod for moving between an open position, in which said retaining portion is disposed away from said first connecting rod to permit placing of said cook unit into said receiving space, and a closed position, in which said retaining portion is disposed on and engages releasably said first connecting rod for retaining said cook unit in said receiving space.

2. The barbecue device as claimed in claim 1, wherein each of said left and right upright posts of said first and second support members has a lower end, said support unit further including four upright leg members which are mounted removably and respectively on said lower ends of said left and right upright posts of said first and second support members and which are adapted to be disposed on a ground surface for supporting said cook unit above the ground surface when said cook unit is supported by said support unit.

3. The barbecue device as claimed in claim 2, wherein said left upright post of each of said first and second support members is formed with four clamping grooves that are displaced vertically from one another, said clamping grooves in said first support member being aligned respectively with said clamping grooves in said second support member, each of said leg members being engageable with a respective aligned pair of said clamping grooves in said first and second support members when removed from said lower end of the respective one of said upright posts.

4. The barbecue device as claimed in claim 1, wherein said cook unit includes a hollow cooking base that has a bottom side formed with first and second positioning grooves for retaining said horizontal bars of said first and second support members, respectively, when said cook unit is supported by said support unit.

5. The barbecue device as claimed in claim 4, wherein said bottom side of said cooking base is further formed with a positioning hole in said first positioning groove, said horizontal bar of said first support member being formed with an upwardly projecting first pin projection that extends into said positioning hole when said cook unit is supported by said support unit, said cook unit further including an engaging plate mounted on said bottom side of said cooking base and extending below said second positioning groove, said horizontal bar of said second support member being disposed between said bottom side of said cooking base and said engaging plate when said cook unit is supported by said support unit, said engaging plate being formed with a notch, said horizontal bar of said second support member being formed with a downwardly projecting second pin projection that engages said notch when said cook unit is supported by said support unit, said horizontal bars of said first and second support members being retained respectively in said second and first positioning grooves when said cook unit is received in said receiving space, said positioning hole and said notch engaging respectively said second and first pin projections when said cook unit is received in said receiving space.

6. The barbecue device as claimed in claim 1, wherein said cook unit includes a cooking base and a top cover disposed over said cooking base, said linking arms of said retainer frame abutting against a top side of said top cover when said retainer frame is moved to said closed position for retaining said top cover on said cooking base.

7. The barbecue device as claimed in claim 6, wherein each of said top cover and said cooking base has a circular periphery, said pivot portion being sleeved rotatably on said first connecting rod and being elongated in shape, said pivot portion having two opposite ends connected respectively to said linking arms, and an intermediate section between said opposite ends, each of said opposite ends of said pivot portion being spaced apart from said peripheries of said cooking base and said top cover when said cook unit is received in said receiving space, said intermediate portion of said pivot portion being disposed closely adjacent to said periphery of said top cover when said cook unit is received in said receiving space, said retainer frame further including a retaining block mounted on said pivot portion so as to be co-rotatable with said pivot portion and so as to be slidable along said pivot portion for moving between said intermediate section and one of said opposite ends of said pivot portion, said retaining block being disengaged from said cook unit when moved to one of said opposite ends of said pivot portion to permit pivoting movement of said retainer frame between said open and closed positions, said retaining block abutting against said top side of said top cover when moved to said intermediate section to help retain said cook unit in said receiving space and to retain said retainer frame in said open position, thereby enabling said retaining portion to serve as a handle.

8. The barbecue device as claimed in claim 7, further comprising a pair of wheel members mounted respectively on said left upright posts of said first and second support members, said wheel members being adapted to be in rolling contact with the ground surface when the support unit is disposed upside-down on the ground surface.

* * * * *